(12) United States Patent
Honegger et al.

(10) Patent No.: US 7,524,152 B2
(45) Date of Patent: Apr. 28, 2009

(54) THREE-AXIS MICRO- AND MESO-SCALE MACHINING APPARATUS

(75) Inventors: Andrew Honegger, Champaign, IL (US); Richard E. DeVor, Urbana, IL (US); Shiv G. Kapoor, Champaign, IL (US)

(73) Assignee: The Board of Trustees if the University of Illinois, Urbana, IL (US)

( * ) Notice: Subject to any disclaimer, the term of this patent is extended or adjusted under 35 U.S.C. 154(b) by 454 days.

(21) Appl. No.: 11/004,045

(22) Filed: Dec. 3, 2004

(65) Prior Publication Data

US 2006/0120819 A1      Jun. 8, 2006

(51) Int. Cl.
*B23C 1/02* (2006.01)

(52) U.S. Cl. .................. 409/235; 408/234; 409/185; 409/189; 409/237

(58) Field of Classification Search ........... 409/137, 409/185, 189, 197, 235–239, 227; 408/91, 408/103, 234
See application file for complete search history.

(56) References Cited

U.S. PATENT DOCUMENTS

| | | | | |
|---|---|---|---|---|
| 1,540,998 A | * | 6/1925 | Plauson | 310/309 |
| 1,711,846 A | * | 5/1929 | Heilborn | 433/122 |
| 2,277,535 A | * | 3/1942 | Treml | 178/81 |
| 2,667,129 A | * | 1/1954 | Graner | 417/326 |
| 2,765,616 A | * | 10/1956 | Cockerell | 60/598 |
| 2,833,887 A | * | 5/1958 | Schrack | 337/49 |
| 3,564,970 A | * | 2/1971 | Larsen | 409/185 |
| 3,640,636 A | | 2/1972 | Reich | |
| 3,754,357 A | | 8/1973 | Schnellmann et al. | |
| 4,149,822 A | | 4/1979 | Lehmkuhl | |
| 4,402,636 A | | 9/1983 | Cupler, II | |
| 4,484,387 A | * | 11/1984 | Nachmany | 483/68 |
| 4,510,668 A | * | 4/1985 | Ishida et al. | 29/561 |
| 4,742,609 A | * | 5/1988 | Neumann | 483/3 |
| 5,261,768 A | * | 11/1993 | Loucks et al. | 409/80 |
| 5,263,800 A | | 11/1993 | Chen | |

(Continued)

FOREIGN PATENT DOCUMENTS

JP            60006323         1/1985

(Continued)

OTHER PUBLICATIONS

Vogler et al., "Development of Meso-Scale Machine Tool (mMT) Systems," Transactions of the North American Manufacturing Research Institution of SME (NAMRI), p. 653-661, 2002.

(Continued)

*Primary Examiner*—Daniel W Howell
(74) *Attorney, Agent, or Firm*—Greer, Burns & Crain, Ltd.

(57) ABSTRACT

A three-axis micro- or meso-scale machining apparatus. Embodiments of the apparatus include a spindle having a tool for machining a workpiece, a z-axis movement platform for supporting the spindle and translating the spindle along a z-axis, a mount for supporting the workpiece, and a suspended x-y axes movement platform for supporting the mount and translating the mount along both x- and y-axes.

41 Claims, 14 Drawing Sheets

U.S. PATENT DOCUMENTS

| | | |
|---|---|---|
| 5,370,481 A | 12/1994 | Altmann et al. |
| 5,486,151 A * | 1/1996 | Bergmann et al. ............. 483/1 |
| 5,555,616 A | 9/1996 | Michalewski et al. |
| 5,611,130 A | 3/1997 | Rummell et al. |
| 5,661,892 A | 9/1997 | Catania et al. |
| 5,687,463 A | 11/1997 | Michalewski et al. |
| 5,919,013 A | 7/1999 | Savoie |
| 6,325,578 B1 * | 12/2001 | Szuba et al. ................ 409/238 |
| 6,334,745 B1 | 1/2002 | Bennett, Sr. |
| 6,540,459 B2 | 4/2003 | Hofmann |
| 6,698,982 B2 * | 3/2004 | Watanabe et al. ........... 409/168 |
| 6,745,455 B2 * | 6/2004 | Popp et al. .................... 29/563 |
| 6,826,821 B2 * | 12/2004 | Geiger et al. ................. 29/563 |
| 6,884,009 B2 * | 4/2005 | Maeda ....................... 409/134 |
| 6,935,003 B2 | 8/2005 | Rahman et al. |
| 7,182,720 B2 * | 2/2007 | Shiraishi et al. ................ 483/3 |
| 7,237,991 B2 * | 7/2007 | Hiramoto et al. ............ 409/239 |
| 2004/0086351 A1 | 5/2004 | Kim et al. |
| 2005/0081363 A1 | 4/2005 | Malshe et al. |
| 2005/0181316 A1 * | 8/2005 | Frodis et al. ................ 430/455 |

FOREIGN PATENT DOCUMENTS

| | | |
|---|---|---|
| JP | 60039044 | 2/1985 |
| JP | 8108308 | 4/1996 |

OTHER PUBLICATIONS

Werkmeister, J., Slocum, A., "Design and Fabrication fo the MesoMill: A Five-Axis Milling Machine for Meso-Scaled Parts," Proc. of: Machines and Processes for Microscale and Meso-scale Fabrication, Metrology and Assembly, ASPE 2003, Winter Topical Meeting, vol. 28, pp. 79-82.

Subrahmanian, R., Ehmann, K.F., "Development of a Meso-Scale Machine Tool (mMT) for Micro-Machining," Japan-USA Symposium on Flexible Automation, Hiroshima, Japan, Jul. 14-19, 2002, pp. 163-169.

Ehmann, K.F., DeVor, R.E., Kapoor, S.G., "Micro/Meso-scale Mechanical Manufacturing—Opportunities and Challenges-", Department of Mechanical Engineering, Northwestern University, Evanston, IL, Department of Mechanical and industrial Engineering, University of Illinois at Urbana/Champaign, Urbana, IL., pp. 1-8, 2002.

* cited by examiner

THREE-AXIS MICRO- AND MESO-SCALE MACHINING APPARATUS

STATEMENT OF GOVERNMENT INTEREST

This invention was made with Government assistance under National Science Foundation Grant No. NSF DMI 98-16302. The Government has certain rights in this invention.

BACKGROUND OF THE INVENTION

The present invention relates generally to the field of machining and fabrication of small-scale components. It relates more particularly to the fields of micro- and meso-scale machining, such as milling and drilling.

It is desirable to produce three-dimensional structures on a micro-scale or meso-scale (that is, 10 micron to 10 mm) consistently and with high resolution. Producing such structures efficiently and with reduced required costs is also desirable.

Lithography-based micro-machining processes are limited to formation of two-dimensional and layered structures and function with a limited set of available materials. Lithography is also a slow process (for example, a processing time controlled by etch deposition rate is usually measured in μm/min), and uses expensive equipment (for example, a typical microfabrication lab has millions of dollars in equipment).

Micro- and meso-scale milling and drilling are a subset of mechanical micro- and meso-scale machining processes. These are similar to traditional milling and drilling in that a rotating tool is used to remove material from a workpiece through chip formation. However, micro- and meso-scale milling and drilling use much smaller tools, e.g., ranging from 10-1000 μm in diameter, and incorporate various differences due to the scale of the process.

Micro- and meso-scale milling and drilling may be used to make three-dimensional geometries in a wide variety of materials with a flexible process. The process is suitable for a wide variety of materials including, but not limited to metals, plastics, composites, and glass. Micro- and meso-scale milling and drilling generally is more flexible in application than, for example, lithography-based microfabrication processes, because it is a single-point process with high material removal rates (several mm$^3$/min), and it is driven by mechanical processes rather than chemical reactions. Parts created with micro- and meso-scale milling and drilling may be quite small (for example, less than 25 mm×25 mm×25 mm).

However, existing machine tools prior to the present invention that have the accuracy needed for micro- and meso-scale milling and drilling are relatively large (for example, table-sized). Additionally, such tools are expensive to manufacture (for example, costs may exceed $100,000).

Various designs for miniature micro- and meso-scale milling testbeds are known in the art. Such designs typically incorporate off-the-shelf components. Challenges exist that are associated with applying existing technology and design principles to miniature machine tool design.

An earlier micro-milling testbed described in Vogler, Liu, Kapoor, DeVor, *Development of Meso-Scale Machine tool (mMT) Systems*, Transactions of the North American Manufacturing Research Institution of SME (NAMRI), pp. 653-661, 2002, has a three-axis CNC machining capability. This testbed, built using off-the-shelf components, has an overall size of 125×180×300 mm, and a working volume of 25 ×15× 25 mm. It has very high (5 g) acceleration capability and uses moving coil actuator stages. Also, the testbed is capable of measuring cutting force using a triaxial force sensor. However, this testbed provides limited machine stiffness, difficult workpiece mounting and interchange, difficult spindle interchange, unprotected moving parts, position-dependent counterbalancing force, and excessive tool runout.

Another machine, described in Werkmeister, Slocum, *Design and Fabrication of the MesoMill: A Five-Axis Milling Machine for Meso-Scaled Parts*, Proceedings of: Machining and Processes for Microscale and Meso-scale Fabrication, Metrology and Assembly, ASPE 2003 Winter Topical Meeting, has a design to create a miniature micro-milling machine with micron-level accuracy. This machine uses ballscrew splines, which are shafts with both helical and axial grooves (used to provide rotary and axial motion with one shaft) for its motion platform. The spindle used is a larger printed circuit board drilling spindle (120,000 rpm max) that feeds axially in addition to rotating. The machine has an overall size of 500× 300×500 mm.

Still another machine, developed by Georgia Tech University, includes a movement platform of fiber-optic positioning stages. These stages have 5-axis capability, but have only a 4 mm/min maximum speed, which in particular applications is too limiting to achieve a good material removal rate, or to achieve the minimum feed-per-tooth for chip removal on each flute pass.

Yet another machine, described in R. Subramanian, K. F. Ehmann, *Development of a Meso-Scale Machine Tool (mMT) for Micro-Machining*, Japan-USA Symposium on Flexible Automation, Hiroshima, Japan, Jul. 14-19, 2002, has a small size (90×60×60 mm), but provides a number of drawbacks. For example, the machine uses piezoelectric stepper actuators that are sensitive to the applied cutting force. This sensitivity causes undesired velocity variations. Also, these off-the-shelf actuators have poor rigidity. Further, to maintain a small overall size, a dental spindle is used. Still further, the spindle lacks precision bearings, resulting in undesirable runout characteristics.

SUMMARY OF THE INVENTION

Preferred embodiments of the present invention provide a three-axis micro- or meso-scale machining apparatus. A preferred apparatus comprises a spindle including a tool for machining a workpiece, a z-axis movement platform for supporting the spindle and translating the spindle along a z-axis, a mount for supporting the workpiece, and a suspended x-y axes movement platform for supporting the mount and translating the mount along both x- and y-axes.

DETAILED DESCRIPTION

Figure 1:
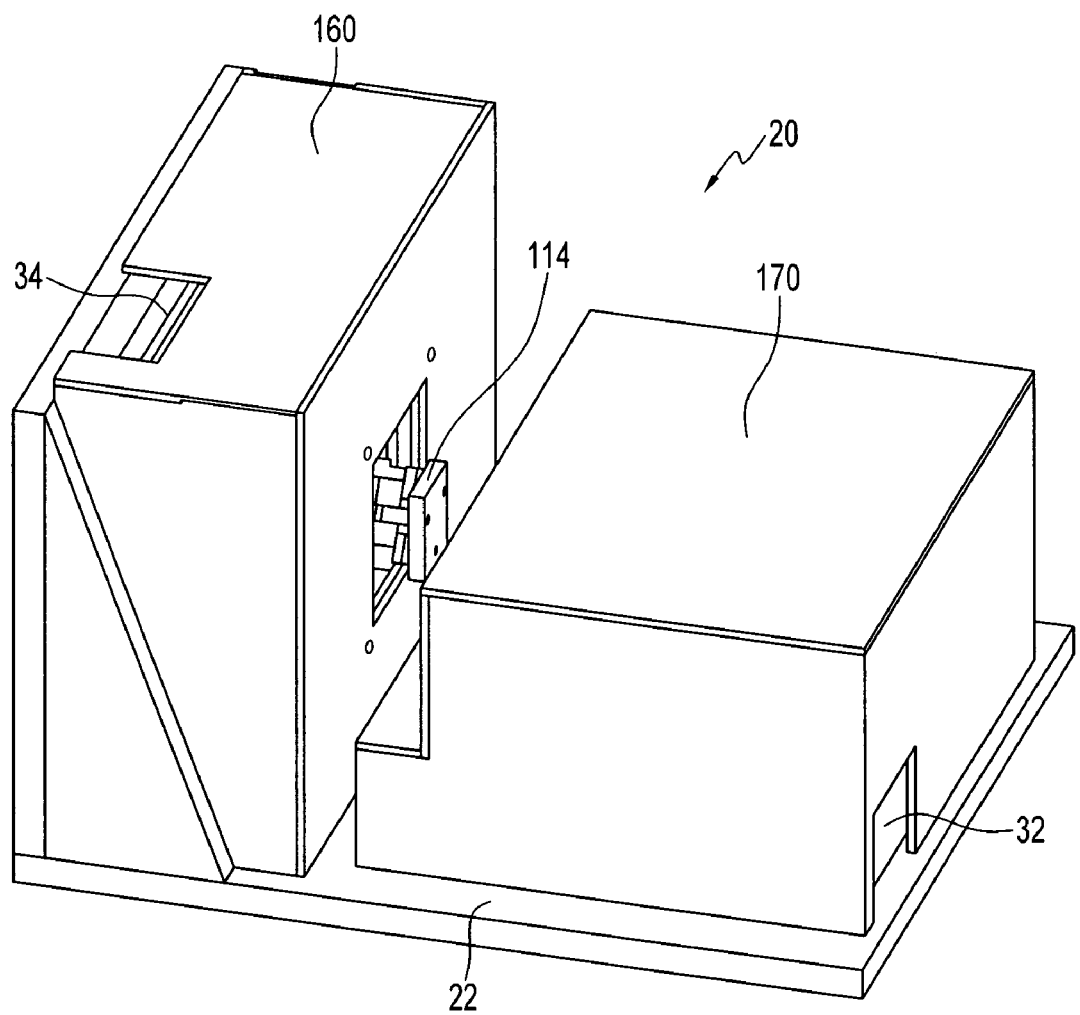
FIG. 1 shows an assembled micro- and meso-scale machining apparatus with chip guards according to a preferred embodiment of the present invention.

Preferred embodiments of the present invention address concerns associated with the fabrication of micro- and meso-scale features (for example, on the order of tens of microns and up) on miniature components (for example, on the order of several millimeters). Preferred embodiments of the present invention allow a size of a machine for manufacture to be commensurate with or similarly sized with the workpieces it will be machining while also providing excellent rigidity, accuracy, acceleration, and operation speed, etc.

It is believed that currently available positioning stages for miniature micro- or meso-scale machining (for example, micro-milling and drilling) platforms lack one or more significant benefits useful to successfully operate such a machine (rigidity, accuracy, acceleration, speed, etc.), because such stages have been designed for other applications. Additionally, packaging of the components into a small volume presents challenges. Also, subsystems that have been developed for large machine tools (for example, counterbalances, spindle mounts, workpiece mounts, enclosures, etc.) may not be adequate for a miniature machine.

Preferred micro- and meso-scale machining apparatuses address concerns of machine stiffness, workpiece and spindle mounting and interchange, unprotected moving parts, counterbalancing, and tool runout, while maintaining high acceleration and force sensing capabilities. Generally, the stiffness of preferred micro- and meso-scale machining apparatuses is addressed with an actuator and a linear guide, resulting in an increase in stiffness, preferably a factor greater than 10× versus other designs. Also in preferred embodiments, workpiece mounting and spindle interchange is improved through kinematic couplings. A chip guard preferably protects moving parts in preferred embodiments. Further, a preferred counterbalancing mechanism includes a constant-force spring mechanism for improving counterbalancing. Tool runout is reduced by incorporating an air bearing spindle into a preferred micro- and meso-scale machining apparatus.

A preferred embodiment of the present invention provides a three-axis machine for micro-scale or meso-scale machining, such as micro-milling and drilling. Preferred embodiments of the present invention are sized and tailored to micro-scale or meso-scale machining processes, and provide improved capabilities and reduced cost versus traditional milling machines. A preferred embodiment of the present micro- and meso-scale machining apparatus has a working volume that is suited for making workpieces several millimeters (up to 25 mm×25 mm×25mm) in overall size and feature sizes of tens of microns and up, while also providing machine stiffness and/or other benefits.

Preferred embodiments of the micro- and meso-scale machining apparatus include moving stages, which are driven by actuators such as moving-coil actuators and guided by linear guides such as linear rolling-element bearings, to control the relative position of a spindle holding a cutting tool and the workpiece. Both the spindle and the workpiece preferably are mounted using a highly repeatable coupling to allow for easier interchanging of parts. Also, a vertical actuator of a preferred apparatus has off-axis movement, which reduces the mass that needs to be offset by the counterbalance mechanism.

Preferred embodiments of the present invention include one or more of: a small (for example, 25 mm×25 mm×25 mm) working volume (range of movement for the machine), a small, ultra-high speed spindle, ball-bearing linear guides, close bearing placement to maximize machine stiffness, moving coil actuators, actuator configuration and placement to reduce force and acceleration-induced errors, actuator features to minimize the amount of vertically moving mass, ultra-high acceleration capabilities, constant force counterbalance and mounting, highly-repeatable workpiece and spindle mounting systems for easy interchangeability and maintenance, a 3-axis force sensor for cutting force measurements, and an enclosure to minimize or prevent damage. However, it is contemplated that one or more of these features may be omitted from various embodiments of the micro-scale machining apparatus. A design of a preferred micro-machining apparatus reduces the overall volume to a small size (for example, a volume of $0.021$ $m^3$), while providing improved stiffness and/or other benefits.

Figure 2:
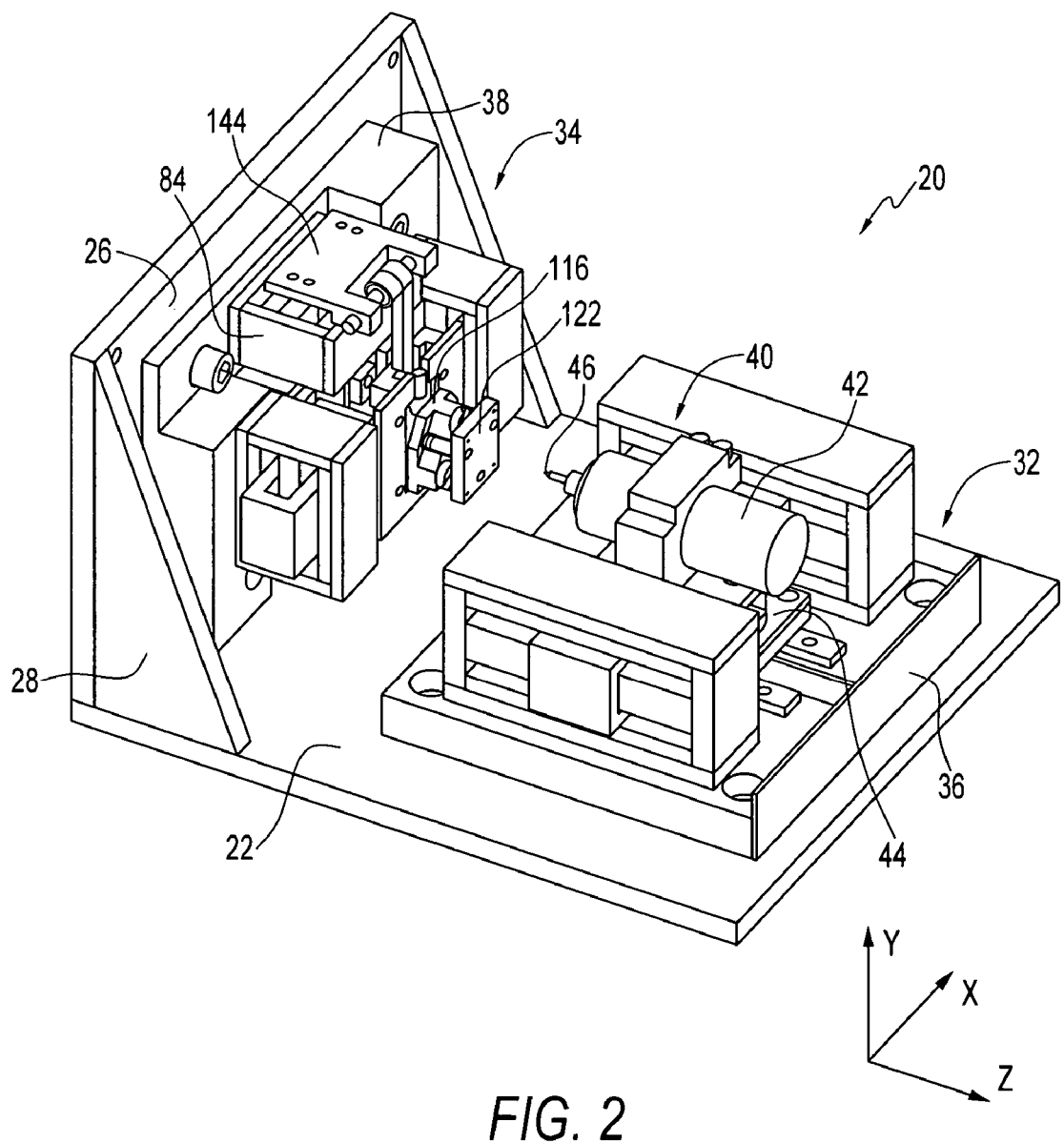
FIG. 2 shows the micro- and meso-scale machining apparatus of FIG. 1 with the chip guards removed.
Figure 3:
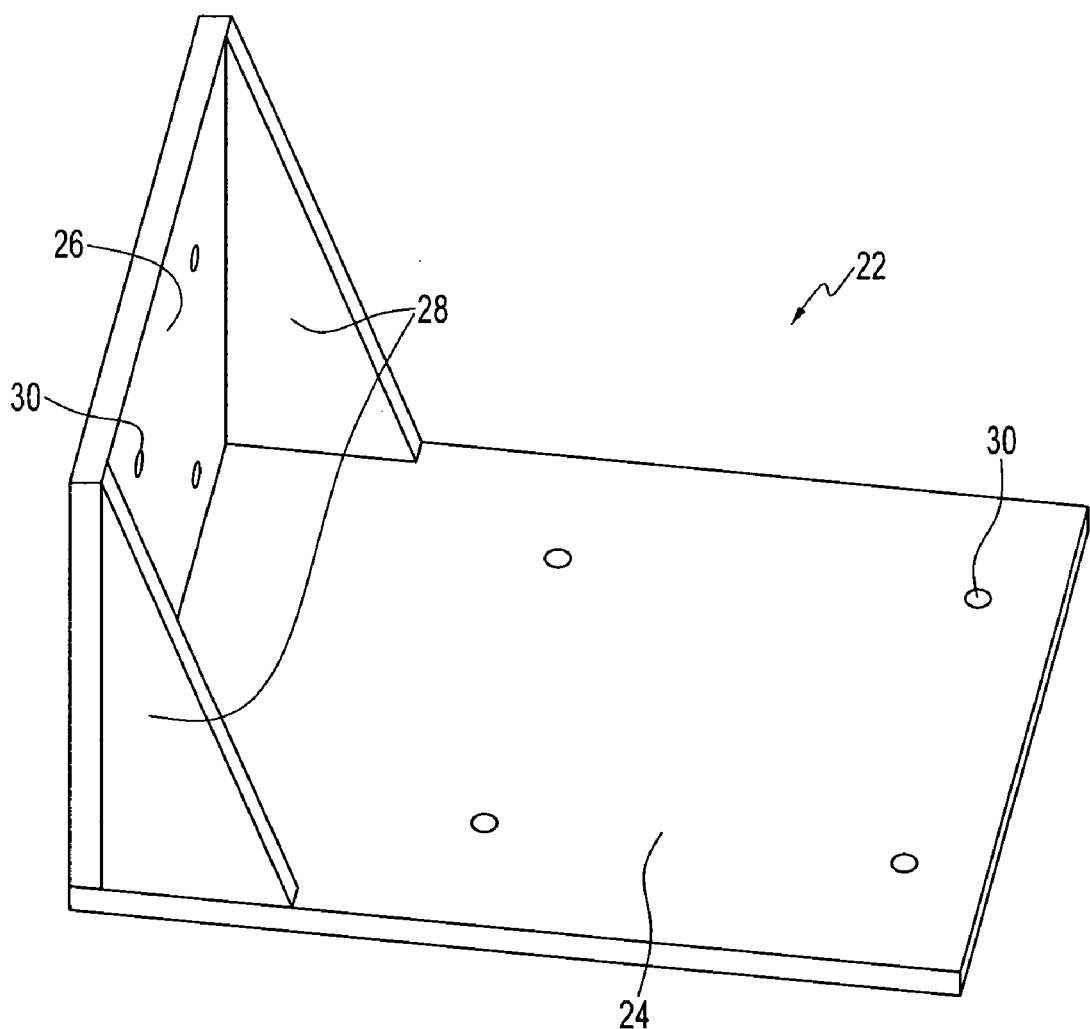
FIG. 3 shows a base for the micro- and meso-scale machining apparatus of FIG. 1.

Referring now to the drawings, FIGS. 1-2 show a micro- or meso-scale machining apparatus 20. The micro- or meso-scale machining apparatus 20 includes a base 22, which in a preferred embodiment is generally L-shaped. As also shown in FIG. 3, the base 22 preferably includes a horizontal base plate 24 (as the base is oriented in FIGS. 1-3) and a vertical base plate 26, which is rigidly and securely mounted to the horizontal base plate, or is formed as a single piece with the horizontal base plate. A pair of angled side supports 28 is mounted to the horizontal base plate 24 and the vertical base plate 26 for bracing the base plates and providing structural support to the base 22. The base 22 and the side supports 26 may be manufactured from, for example, steel or other rigid, strong metal or composite material. One or more apertures 30 are provided in the horizontal base plate 24 and the vertical base plate 26 for insertion of fasteners to mount components of the micro- and meso-scale machining apparatus 20 to the base 22.

For example (as best viewed in FIG. 2), in a preferred embodiment, a z-axis moving platform 32 for moving and positioning a tool along a z-axis, and an x-y axes moving platform 34 for securing a workpiece and moving a workpiece along x- and y-axes, are fixedly mounted to the base 22. The platforms 32, 34, for example, may be secured by fasteners such as bolts (not shown) inserted through the apertures 30. Preferably, the length, width, and height of the base 22, and thus the outer length, width, and height of the overall micro- or meso-scale machining apparatus 20, are minimized to the extent possible or practical (as one non-limiting example, about 300 mm×350 mm×200 mm), though the overall size of the micro- or meso-scale machining apparatus 20 may be made larger if desired.

As used herein, and as shown in FIG. 2, the z-axis, also referred to as a spindle axis, is the axis of movement of a tool and spindle motor in a direction towards and away from a workpiece (from left to right and vice versa as shown in FIG. 2). A positioning stage for movement in the z-axis is referred to herein as a z- or spindle-axis stage. The x-axis is also referred to as the horizontal axis, and thus a positioning stage for movement in the x-direction is referred to as a horizontal stage. The y-axis is also referred to as the vertical axis, and thus a positioning stage for movement in the y-direction is referred to as a vertical stage.

As also shown in FIG. 2, the z-axis movement platform 32 includes a machine base assembly (z-axis base) 36, which supports the z-axis movement platform. The machine base assembly 36, preferably a solid metal block, is fixedly mounted to the horizontal base plate 24 of the base 22 as described above. Similarly, the x-y axes movement platform 34 is fixedly mounted to the vertical base plate 26 of the base 22 via an x-y axes base 38, which preferably includes a solid metal block. As the x-y axes movement platform 34 preferably is mounted on the vertical base plate 26, one or more components of the x-y axes movement platform, supporting a workpiece to be machined, are suspended above the base 22, such as above the horizontal base plate 24. Particular features of preferred embodiments of the present invention address concerns relating to effects of this suspension on consistent and high-resolution micro- and meso-scale machining.

In preferred embodiments, the z-axis and x-y axes movement platforms 32, 34 are configured to increase stiffness and reduce force-induced errors, among other deficiencies. However, the movement platforms 32, 34 preferably maintain a minimal overall size to reduce the size of the micro- and meso-scale machining apparatus 20.

Figure 4:
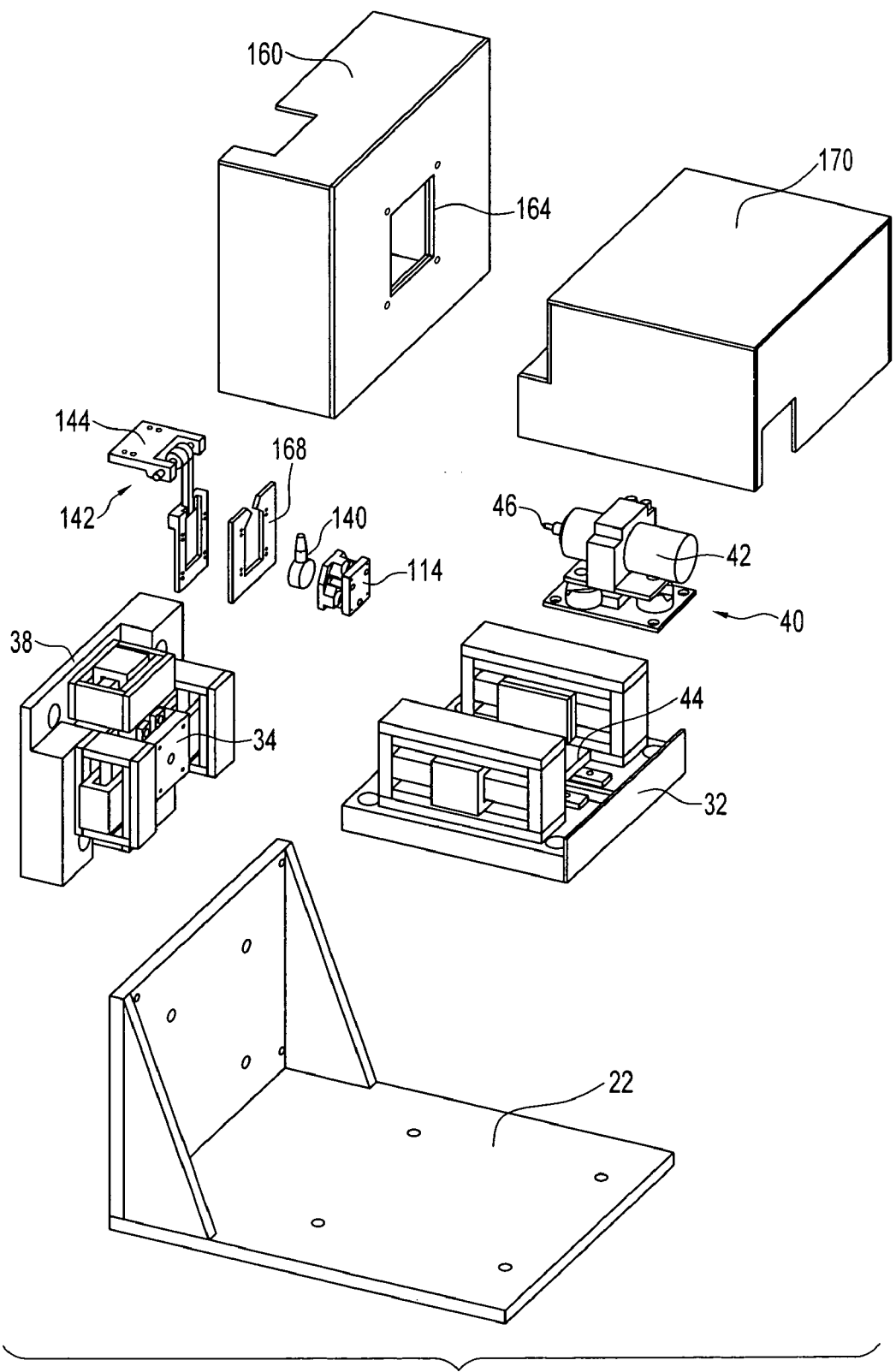
FIG. 4 is an exploded view illustrating general components of the micro- and meso-scale machining apparatus of FIG. 1.

Referring to FIGS. 2 and 4, a spindle assembly 40 for securing a spindle 42 is mounted to a z-axis mounting plate 44 by suitable fasteners. The spindle 42 rotates a tool 46 for engaging (machining) a workpiece. A spindle used in an exemplary embodiment of the present invention is a NSK AMS-1600 air bearing, air turbine spindle. This spindle is capable of 160,000 rpm and has low runout. A preferred spindle has high-speed capabilities (for example, about 40,000 rpm, or greater) and high rotational accuracy, while being appropriately sized for the micro- or meso-scale machining apparatus 20. The preferred spindle 42 uses a miniature precision collet to hold the tool 46 in place. A preferred tool 46 used in combination with the spindle 42 has a ⅛" diameter shank. This exemplary spindle 42 generates 14 W of power, and thus is useful for micro-scale machining operations especially, which do not require a large amount of power. A suitable power source (not shown) is coupled to the spindle 42 for rotating the tool 46 during a machining operation.

Figure 5:
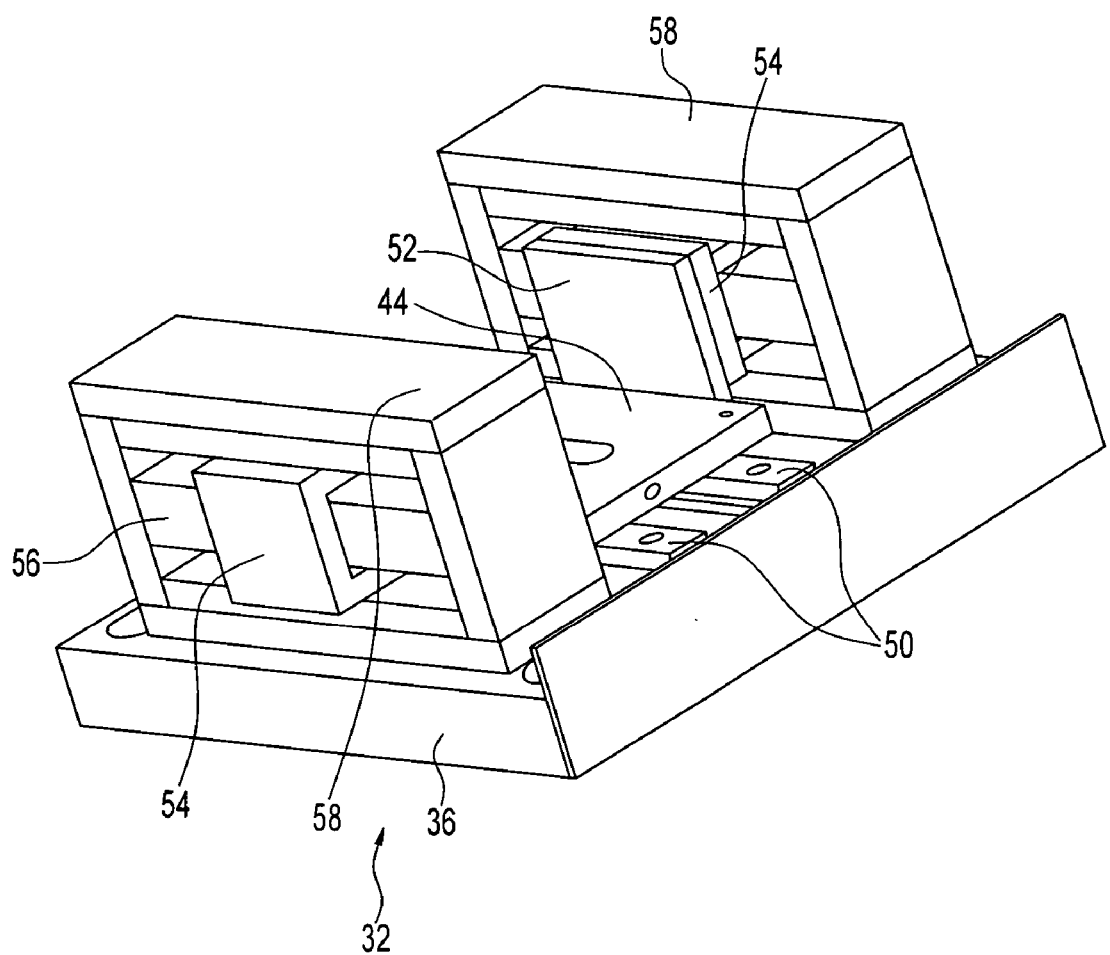
FIG. 5 is a perspective view of a z-axis movement platform according to a preferred embodiment of the present invention.
Figure 6:
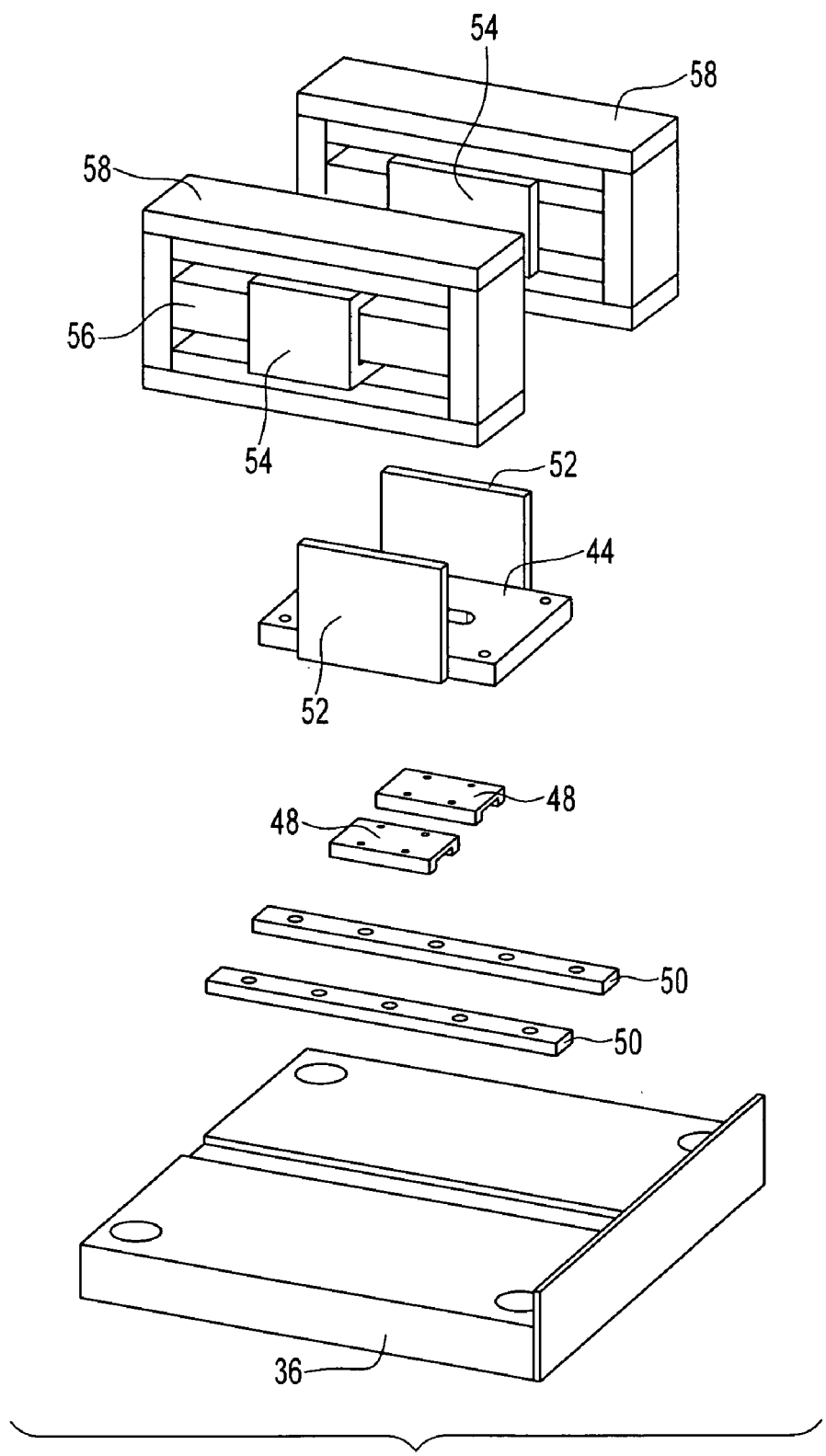
FIG. 6 is an exploded view of the z-axis movement platform of FIG. 5.

As also shown in FIGS. 5 and 6, the z-axis mounting plate 44 is securely mounted to a pair of z-axis bearing carriages 48, which in turn are slidingly disposed above and engaged with a pair of z-axis bearing rails 50, respectively, for allowing sliding movement of the z-axis mounting plate along the z-direction. The z-axis bearing rails 50 are fixedly mounted to the z-axis base 36, and in combination with the moving bearing carriages 48, act as linear guides for the spindle mount assembly 40. In a preferred embodiment, the z-axis bearing carriages 48 include ball bearings for reducing movement friction while providing consistent, stable movement, though other bearings may be used.

As shown in FIG. 6 with respect to the z-axis, and in preferred embodiments of the z-axis (that is, the spindle axis) and the x- and y-axes movement platforms 32, 34 (for the horizontal and vertical stages), two parallel linear guides are provided per axis of movement. More preferably, the z-axis bearing rails 50 are coaxial with the z-axis of motion traveled by the spindle 42. Put another way, the z-axis bearing rails 50 preferably are symmetric about a centerline formed by the axis of movement of the spindle 42.

Conventionally, in small-scale positioning stages, only one guide per movement axis is used in order to minimize size. However, when only one guide is used, any force applied to the single guide produces a moment on the guide if it does not act through the axis of travel. Experiments performed by the present inventors on ball-type linear bearings have shown that their compliance to moment loads is significantly greater (about 5 times) than the compliance to radial loads. The use of two linear guides per axis reduces or eliminates these moment loads and increases the stiffness by more than a factor of two (preferably, approximately a factor of ten).

As shown in FIGS. 5 and 6, a pair of vertical plates 52 is mounted to and extends vertically from the z-axis mounting plate 44. Alternatively, the vertical plates 52 may be formed as a unitary piece with the mounting plate 44. The two vertical plates 52 are respectively disposed symmetrically with respect to the z-axis (the direction of movement of the spindle 42), and thus face one another on opposing sides of the mounting plate 44. Each of the pair of vertical plates 52 is in turn mounted to a frame of a z-axis motor coil 54. The z-axis motor coil 54 slides in the z-direction around, but not in contact with, a rail 56 of a stationary z-axis motor stator 58, which includes one or more permanent magnets. The permanent magnets preferably are integrated into the motor stator 58. To facilitate the magnetic field of the permanent magnets, the rails 56 extend along the z-direction. The motor coils 54 with the motor stators 58 act as actuators for moving the spindle assembly 40 along the z-direction. A suitable selective power source (not shown) is coupled to each of the motor coils 54 to selectively actuate the z-axis movement platform 32.

Preferably, the actuators, for example including the motor coils 54 and the motor stator 58, are symmetrically disposed in the z-axis movement platform 32 with respect to the axis of movement, as shown, for example, in FIG. 5. Similarly, actuators for the x- and y-axes preferably are symmetrically disposed for the horizontal and vertical stages with respect to the x- and y-axes, respectively. In typical positioning stages for miniature tool designs, micro-scale positioning stages use a single actuator and linear guide per axis, and the actuator is not coaxial with the guide, to minimize the size of the device. Symmetric placement of the actuators according to preferred embodiments of the micro- or meso-scale machining apparatus 20 reduces or eliminates any moment that would otherwise be induced on the linear guides due to the reaction of the actuators to the cutting force. This in turn significantly reduces force-induced errors in the overall micro- or meso-scale machining apparatus 20.

The spindle axis actuator (particularly the motor coils 52) preferably is raised, for example from the z-axis base 36, to act through the center of mass of the spindle 42 for reducing errors induced by high acceleration rates. Raising the spindle axis actuators to act through the center of mass is not a primary concern in larger and slower machine tools, because the acceleration rates are relatively low. However, due to the high acceleration rates of miniature machine tools, this preferred design consideration provides a significant benefit. This feature reduces or eliminates induced moments on the linear guides (the rails 50 and the bearing carriages 48) that result from the acceleration of the spindle 42. Also, in larger machine tools, the spindle 42 is not the most massive moving component, versus preferred embodiments of the present micro- and meso-scale machining apparatus 20, so it is not necessary to place the spindle along the line of actuation.

It is also preferred that the linear guides (particularly, the fixed bearing rails 50) are disposed in close proximity (for example, within 50-75 mm) to a cutting location of the tool 46, as shown in FIG. 2. Placing the linear guides in close proximity to the cutting location reduces the moment induced on the bearing set in the bearing carriage 48 for each axis. This provides a smaller overall load on each bearing, thereby decreasing the deflection (equivalent to increasing the stiffness) of the machine. In combination with other preferred features, this increases stiffness over conventional actuators.

Figure 7:
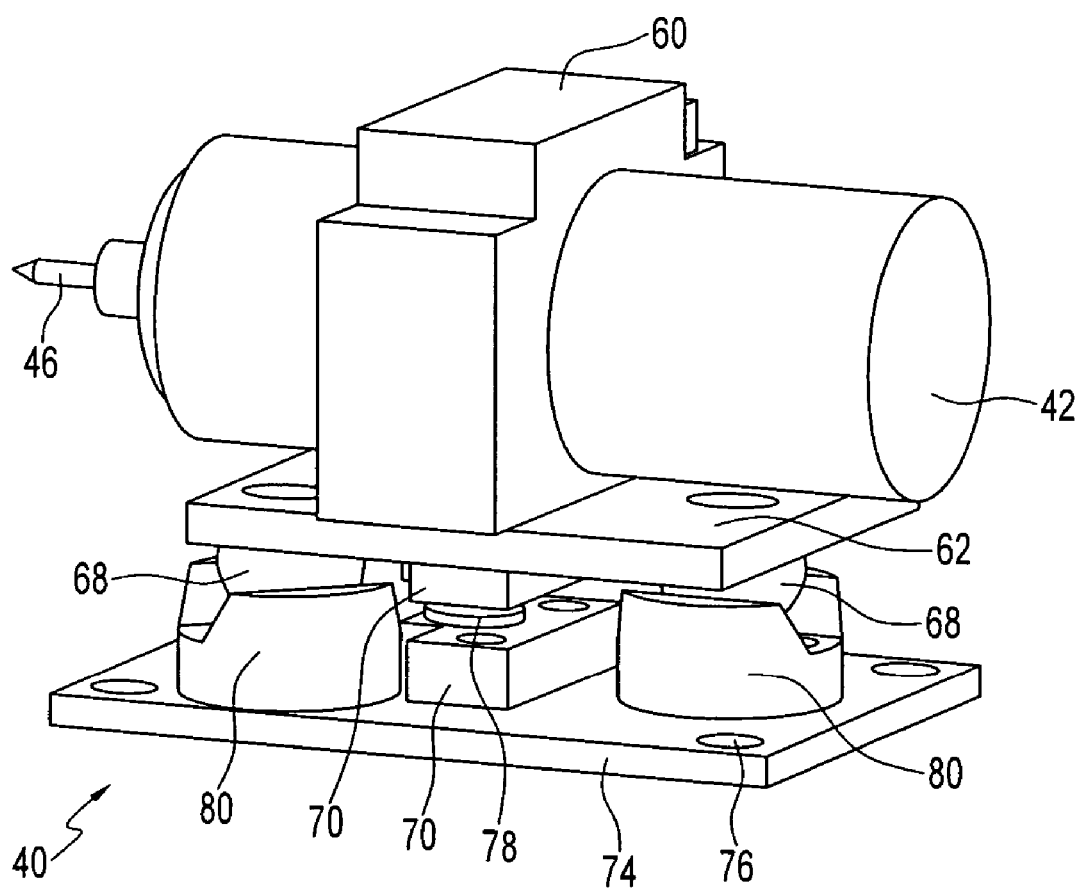
FIG. 7 is a perspective view of a spindle mount according to a preferred embodiment of the present invention.
Figure 8:
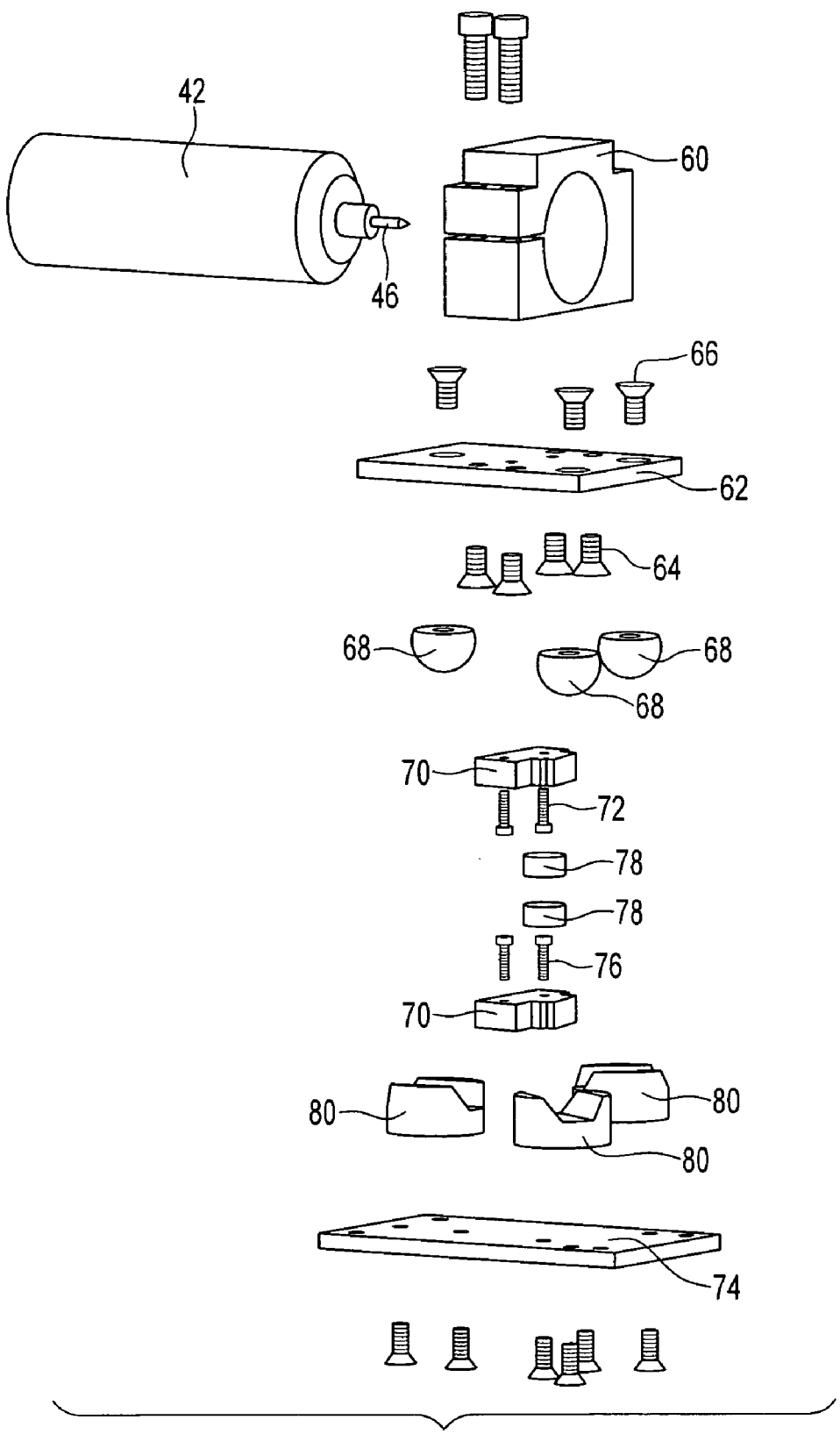
FIG. 8 is an exploded view of the spindle mount of FIG. 7.

FIGS. 4, 7, and 8 show a preferred spindle mount assembly 40, which retains the spindle 42 and moves the spindle with the tool 46 for machining. A steel spindle mounting clamp 60 secures and supports the spindle 42, and raises the spindle above an upper spindle mount plate 62, which also supports the spindle. Fasteners, such as screws 64, secure the upper spindle mount plate 62 to the spindle mounting clamp 60.

In preferred embodiments of the micro- and meso-scale machining apparatus 20, the spindle 42 is mounted using a magnetically preloaded kinematic coupling. Spindles mounted in this manner can be removed and remounted very easily, preferably without any need for realignment or recalibrations.

Kinematic couplings are highly repeatable, but require a preloading mechanism to stay connected. Such a preloading mechanism may include, for example, magnets, springs, or screws. Magnets are preferred due to their non-contact nature, as springs and screws reduce the repeatability of the coupling.

For example, as shown in FIGS. 7 and 8, multiple (as shown, three) screws 66 are connected to the upper spindle mount plate 62, positioned such that each of the shanks of the screws extend downwardly (as oriented in FIGS. 7 and 8) to connect to a truncated mounting ball 68. A generally T-shaped magnet holder 70 is secured to the underside of the upper spindle mounting plate 62 by fasteners such as screws 72. Another generally T-shaped magnet holder 70 is secured to a top surface of a spindle mount base 74 by additional screws 76. The spindle mount base 74 includes a number of apertures 76 through which connectors are inserted for mounting the spindle mount base to the z-axis mounting plate 44.

Each of a pair of rare earth magnets 78 is secured to one of the magnet holders 70, respectively, and they preferably are disposed so that the preloading is positioned centrally, in between the truncated mounting balls 68. The rare earth magnets 78 attract one another to provide the preloading mechanism described above for the kinematic coupling of the spindle 42.

For the kinematic coupling, multiple vee-blocks 80 mounted to the top surface of the spindle mount base 74 respectively mate with the truncated mounting balls 68. These provide a removable, yet highly repeatable and secure kinematic coupling in combination with the preloading mechanism. It will be understood that other types or embodiments of preloading and/or kinematic coupling are possible.

The x-y axes movement platform 34 preferably includes certain similar features to that of the z-axis movement platform 32, including symmetrically disposed linear guides and actuators, and kinematic couplings. For example, and referring to FIGS. 4, 9, and 10, a preferred x-y axes movement platform 32 generally includes the x-y axes base 38, upon which is mounted a symmetrically disposed pair of x-axis motor coils 82 and x-axis motor stators 84 (forming the x-axis actuator), a symmetrically disposed pair of y-axis motor coils 86 and y-axis motor stators 88 (forming the y-axis actuator), and a symmetrically disposed pair of x-axis bearing rails 90 and y-axis bearing rails 92 (forming, in part, x- and y-axis guides).

Figure 9:
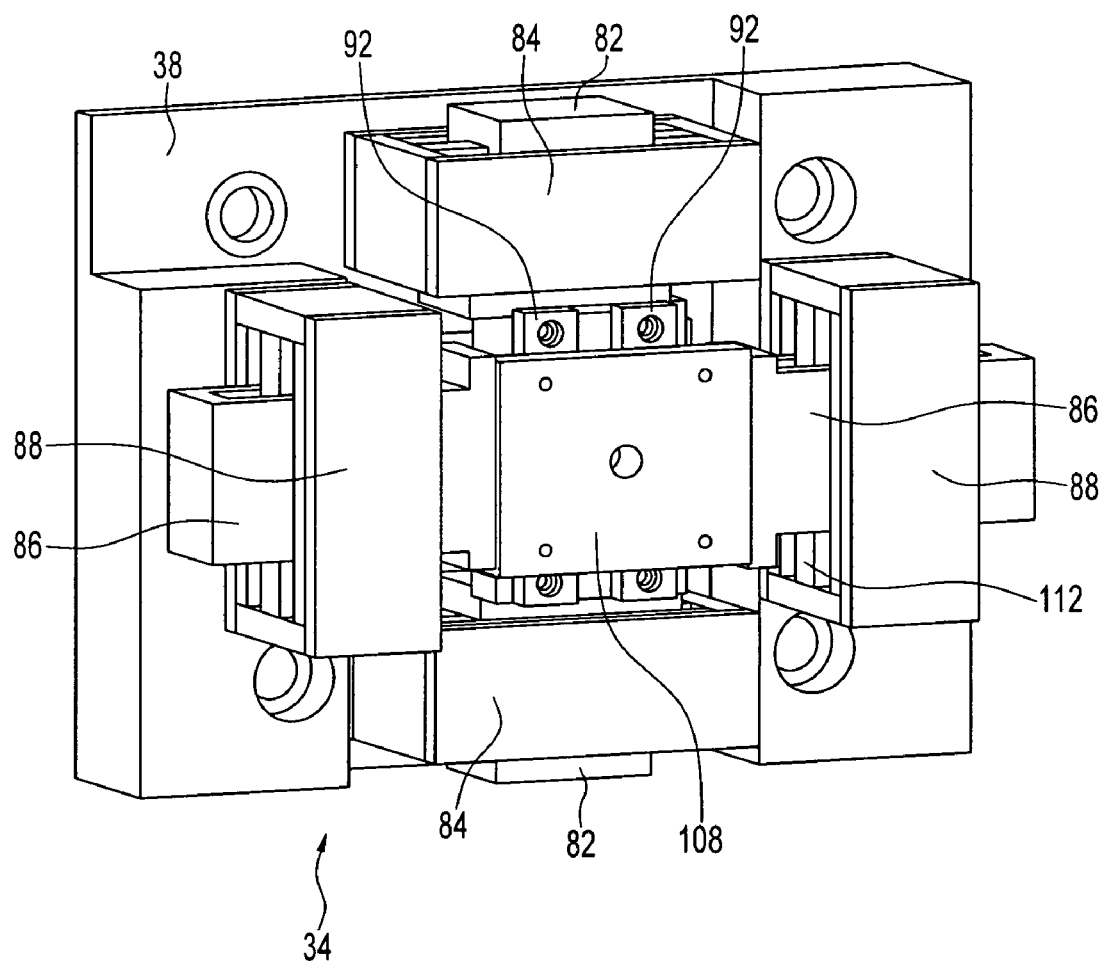
FIG. 9 is a perspective view of an x-y axes movement platform according to a preferred embodiment of the present invention.
Figure 10:
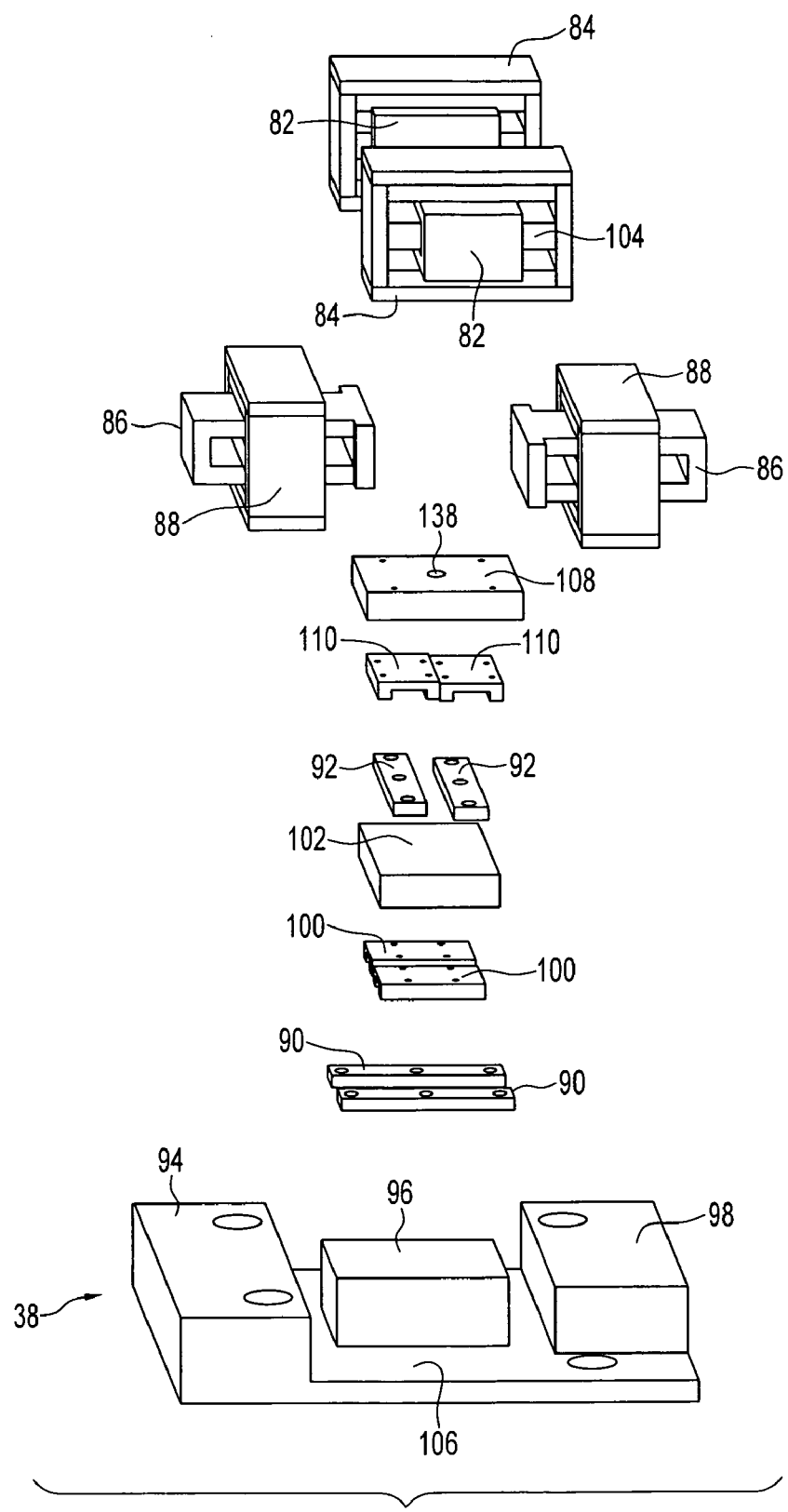
FIG. 10 is an exploded view of the x-y axes movement platform of FIG. 9.

Referring particularly to FIGS. 9 and 10, the x-y axes base 38, securely mounted to the vertical surface 26 of the base 22, includes left, center, and right raised portions 94, 96, 98 (as oriented in FIG. 10) to provide multiple levels separating the actuators for x-axis translation (horizontal stage) from the actuators for y-axis translation (vertical stage). The pair of x-axis bearing rails 90, symmetrically disposed with respect to the x-axis and positioned close to the x-axis, is secured to a top surface of the center raised portion 96 of the x-y axes base 38 to provide a linear guide for x-axis movement. X-axis bearing carriages 100 are slidingly coupled to and engaged with the x-axis bearing rails 90, and in turn support an x-axis mounting plate 102 secured to the x-axis bearing rails.

The x-axis mounting plate 102 is secured to the symmetrically positioned x-axis motor coils 82, which move along rails 104 of the x-axis motor stators 84, including permanent magnets as described above regarding the z-axis motor stators 58. The x-axis motor stators 84 are fixedly mounted to a lower surface 106 of the x-y axes base 38, and the x-axis motor coils 82 and bearing rails 90 preferably are raised to allow the x-axis mounting plate 102 to move above the center raised portion 96 and to allow the horizontal stage actuation to operate through the center of mass, preferably similarly to the z-axis actuator.

A y-axis mounting plate 108 is disposed above the x-axis mounting plate 102, slidingly coupled to the x-axis mounting plate via the pair of symmetrically disposed y-axis bearing rails 92 secured to the x-axis mounting plate and a pair of y-axis bearing carriages 110 slidingly coupled to and engaged with the y-axis bearing rails. The x- and y-axis bearing carriages 100, 100 preferably comprise ball or other rolling element bearings. However, it is contemplated that other types of bearings, such as air bearings, may be used for the linear guides along the x-axis, y-axis, and the z-axis.

The pair of y-axis motor stators 88 for actuating movement in the y-direction are disposed above and secured to the left and right raised portions 94, 98 of the x-y axes base 38. The y-axis motor stators 88 preferably include permanent magnets. The y-axis motor coils 86 engaged with and slidingly coupled to rails 112 of the y-axis motor stators, when actuated, move the y-axis mounting plate 108, secured to the y-axis motor coils, along the y-direction. A suitable power supply (not shown) is coupled to the x-axis motor coils 82 and the y-axis motor coils 86, respectively, for selective actuation. As will be appreciated by those of ordinary skill in the art, a controller or computer (such as a CNC controller) may be operatively coupled to the x-axis, y-axis, and z-axis actuators.

The movement stages for the x- and y-axes preferably have actuators raised from their respective surfaces (of the x-y axes base 38) that are positioned closer to the center of the moving mass to reduce the moment. This packaging feature in turn reduces the inertial errors of the machine.

Off-axis movement is a useful capability of moving coil actuators. An off-axis motion design preferably is used in the x-y movement platform 34 to reduce the mass suspended above the base 22, most preferably for the y-axis movement stage (vertical stage). This is accomplished in a preferred embodiment by over-sizing the y-axis stator coils 86 so they can move on an axis perpendicular to the motor's line of actuation. For example, as shown in FIGS. 4, 9, and 10, the y-axis motor coils 86 are elongated along the x-direction so that they are free to move side-to-side (as shown, in the x-direction, perpendicular to the line of actuation) as well as back-and-forth (as shown, in the y-direction, parallel to the line of actuation). Accordingly, the y-axis mounting plate 108 mounted thereto, to which the workpiece is also mounted, is translatable along both the x- and y-axes.

Off-axis movement allows the (typically heavy) permanent magnets in the y-axis motor stators 88 of a moving coil actuator to be stationary in a stacked-stage configuration. In other words, the stators in a stacked positioning stage (the y-axis motor stators 88) preferably are not moved by the actuators in the next-lower positioning stage (the x-axis actuators), thus reducing the amount of moving mass on the x-axis, and the motor power required to move it. This benefit is used in preferred embodiments of the micro- and meso-scale machining apparatus 20 to reduce the mass of the vertical stage by roughly a factor of two. This lowered mass simplifies the design of a counterbalance in preferred embodiments and improves the dynamic response of the horizontal axis by reducing the weight of the vertical axis.

Though preferred x-axis actuators, y-axis actuators, and z-axis actuators employ a motor coil and a motor stator, it is contemplated that other actuators may be used in particular embodiments of the invention. For example, a linear motor may be substituted. However, a linear motor may not provide the off-axis movement described above, which, though not necessary in all embodiments, is advantageous in preferred embodiments.

As with the mechanism described for mounting the spindle 42, a preferred workpiece mount assembly 114 includes a kinematic coupling mechanism. Referring now to FIGS. 4, 11A-11B, and 12, the exemplary workpiece mount assembly 114 shown includes a force sensor preload base 116, into which are formed passages 118 for receiving multiple (preferably, three) small vee-blocks 120, and a workpiece mounting plate 122, upon which the workpiece is securely mounted for machining. The vee-blocks 120 are inserted and secured into the passages 118. Mounting balls 124 secured to the underside of the workpiece mounting plate 122 insert into the small vee-blocks 120 for removably mounting the workpiece mounting plate, and thus removably mounting the workpiece.

The force sensor preload base 116 further includes receptacles 126 for receiving multiple (preferably, three) magnet posts 128 extending from the underside of the workpiece mounting plate 122. Rare earth magnets 130 are attached to a free end of each of the magnet posts 128. Additional rare earth magnets 132 are secured to the bottom of the receptacles 126 for attracting the rare earth magnets 130 and thus providing magnetic preloading. The vee-blocks 120 and the magnet posts 128 are symmetrically disposed about the center of the force sensor preload base 116, in alternating fashion about the periphery of a raised portion 134 of the force sensor preload base.

A workpiece mount using a kinematic coupling preferably can be removed mid-process, inspected, remounted, and machined further without any realignment steps. Still further, manual workpiece mounting to the machining apparatus 20 can be done quickly (e.g., less than five seconds), and precise automated workpiece mounting may be achieved without the need for a high precision robotic arm. This is possible because using a preferred workpiece mounting, an automatic arm merely needs to get sufficiently close to allow the magnetic preload to pull the workpiece into position.

To restrict or prevent a magnetic preloading mechanism from undesirably attracting machined chips produced during a machining operation, and to allow the application of a force sensor preload mechanism in the center of the workpiece coupling, the magnetic preload in preferred embodiments of the workpiece mount assembly 114 is applied by attaching the magnets 130 to the magnet posts 128, which extend backward from the periphery of the coupling. This positioning moves the magnets 130 far enough from the workpiece to reduce or eliminate the attraction of chips, and makes the application of a force sensing preload possible.

Micro- and meso-scale machining testbeds, such as micro-milling testbeds, preferably employ force sensing for study of the process. However, due to the size of the testbed and available force sensors, this task presents several challenges. Nearly all testbeds on a micro- or meso-scale use Kistler tri-axial force sensors, because these sensors have desirable characteristics. However, these sensors require a relatively thick plate on each side of the sensor to achieve the required compressive preload. These plates add to the distance that the sensor extends away from the machine, which is poor from a machine stiffness perspective.

A preferred embodiment of the micro- and meso-scale machining apparatus 20 uses the machine axis plate, particularly the y-axis mounting plate 108, and the workpiece kinematic mount base, particularly the force sensor pre-load base 116 securely mounted to the y-axis mounting plate, to achieve a preload on a force sensor. This combination of components reduces the overhang of the workpiece by, for example, a factor of two, because it eliminates the requirement of the two thick preloading plates. This improves the stiffness of the machine, because the cutting force is closer to the linear guides, such as the x-axis and y-axis bearing rails 90, 92, due to the smaller overhang. This also reduces the overall size of the machine.

Figure 11A:
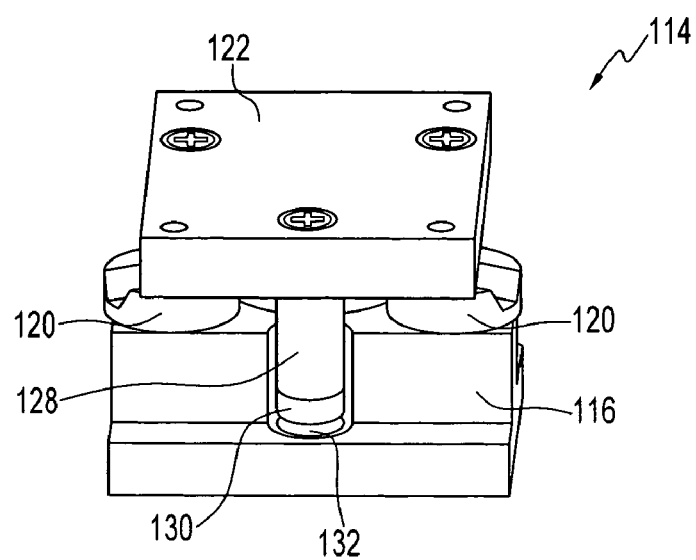
FIGS. 11A-11B are a perspective view and an exploded view, respectively, of a workpiece mount according to a preferred embodiment of the present invention.
Figure 11B:
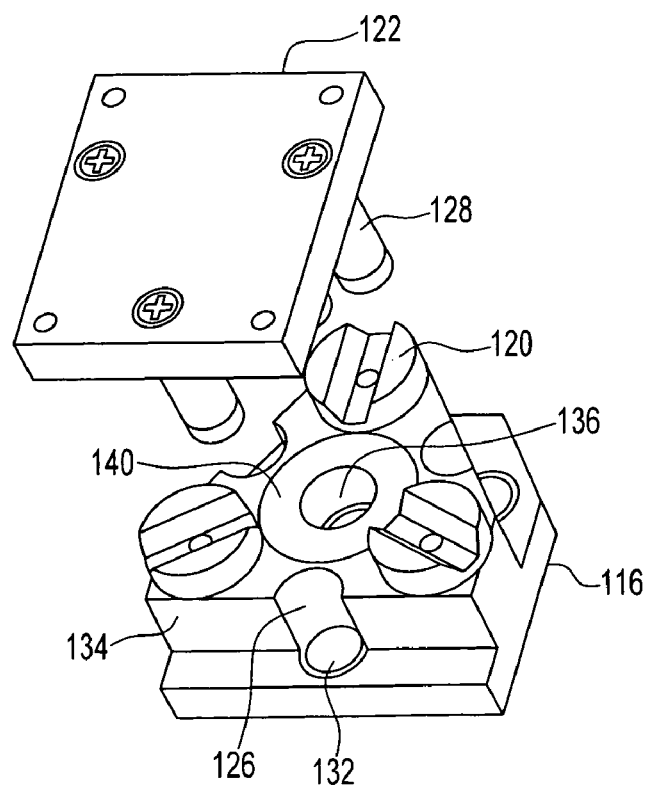
Figure 12:
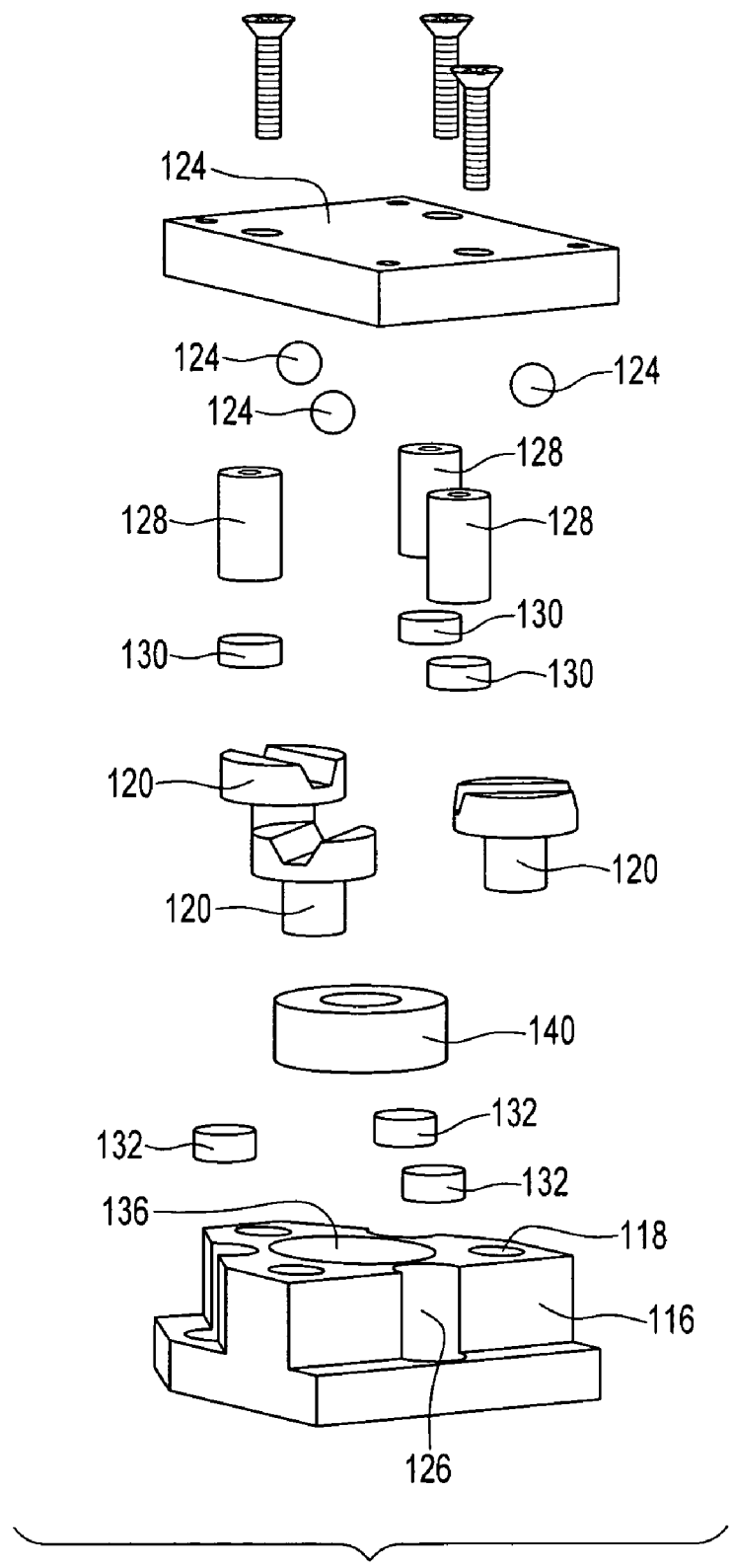
FIG. 12 is an exploded view illustrating components of the preferred workpiece mount of FIGS. 11A-11B.

Particularly, and referring to FIGS. 11A-11B and 12, a passage 136 extends through the force sensor preload base 116 at a center of the kinematic coupling (that is, the center of the preload base). A shank of a force sensor preload fastener such as a bolt (not shown) extends through the passage 136 and threads into a central aperture 138 (see FIG. 10) of the y-axis movement platform 108. Surrounding the shank of the force sensor preload bolt, a force sensor preload nut 140 is also disposed within the passage 136. The force sensor preload nut 140 and bolt are part of a Kistler preloading kit in a preferred embodiment.

The preload bolt preferably is threaded at both ends. A first end is threaded into the y-axis movement platform 108. The force sensor is placed on the bolt, and the force sensor preload base 116 is placed on the bolt. The force sensor preload nut 140 is threaded onto the bolt and tightens against the force sensor preload base 116. Tightening the force sensor preload nut 140 applies a preload to the bolt and the force sensor. The force sensor preload nut 140 is coupled to a suitable device (not shown) via connections (not shown) for receiving and detecting signals relating to force exerted on the force sensor preload nut. Force-sensing operation will be understood by those of ordinary skill in the art.

A constant-force spring counterbalance is implemented in a preferred embodiment of the machining apparatus 20. One advantage of this type of counterbalance is that it always exerts a constant force. Linear springs, by contrast, exert a different force depending on the amount of extension; this leads to different dynamic responses of the counterbalanced stage over the range of travel. Constant-force springs also have advantages over other constant-force counterbalances, such as air cylinders and weight/pulley systems. Miniature air cylinders, for example, only actuate in an extension direction, so the air cylinder must be mounted below the moving stage or use long connecting links between the stage and the rod of the cylinder. Weight and pulley systems are limited to 1 g of acceleration, as an upward acceleration of more than 1 g will cause slack in the line. Thus, these features are not easily implemented into a miniature machine tool.

The constant-force spring has none of these drawbacks. It always exerts a constant force, can easily be mounted above the moving mass, and can operate under accelerations much greater than 5 g. Thus, the constant-force spring is preferred when the mass and available space is small.

Figure 13:
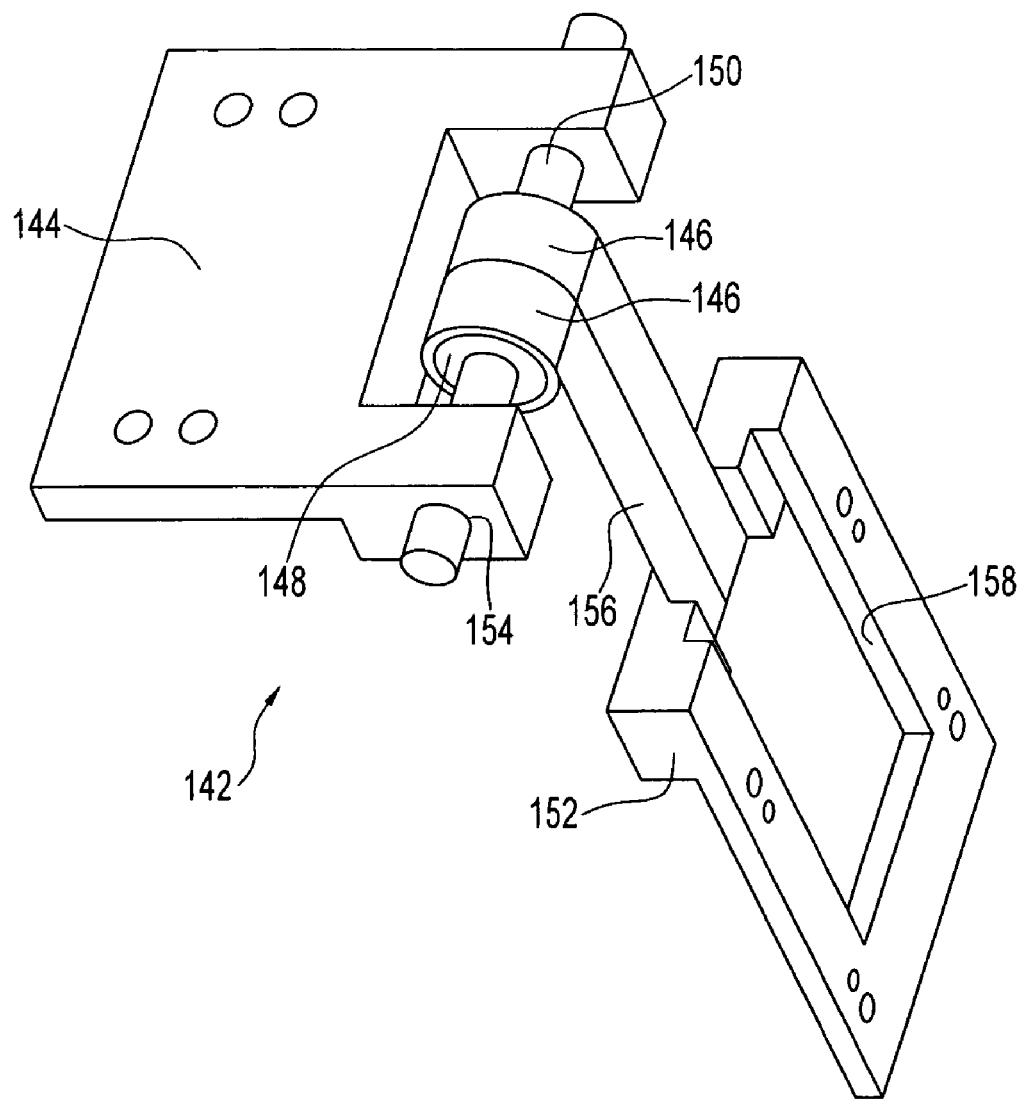
FIG. 13 is a perspective view of a counterbalance according to a preferred embodiment of the present invention.

Referring now to FIGS. 2 and 13, a preferred counterbalance mechanism 142 includes a counterbalance motor mount 144 for mounting the mechanism, one or more (as shown, two) constant-force springs 146 for a counterbalance, one or more (as shown, two) bearings 148, a shaft 150 extending through the counterbalance motor mount, and an attachment bracket 152. Preferred constant force springs 146 include a coiled strip of metal, for example, spring steel, which uncoils when a critical force level is applied. The springs 146 are coiled around the bearings 148, which in turn are rotatably mounted on the shaft 150. The shaft 150 is connected to the counterbalance motor mount 144 via apertures 154 in the mount.

The counterbalance motor mount 144 is attached, directly or indirectly, to a moving part of the actuator in a lower (preferably, the next-lower) positioning stage. In the embodiment shown, this moving piece is the x-axis motor coil 82 (the horizontal stage) (see FIG. 2). This enables the entire counterbalance mechanism 142 to move with the horizontal stage, and it simplifies the motion of the constant-force springs 146 and the bearings 148, as the constant-force springs only need to uncoil instead of uncoiling and moving with the horizontal stage.

The extending ends 156 of the springs 146 are mounted to the y-axis mounting plate 108 using the attachment bracket 152. Suspended over the base 22, the workpiece mount assembly 114 extends through an opening 158 of the attachment bracket 152.

Because the complete counterbalance mechanism 114 is mounted on the moving part (the x-axis moving coil 82) of the (horizontal) stage beneath it, this allows the base of the counterbalance system (the counterbalance motor mount 144) to move at exactly the same rate as the connecting point to the moving mass, reducing or eliminating off-axis motion the counterbalance would otherwise need to resist. This also makes it easier for the vertical stage to be stacked over the horizontal stage (the term "over" as it pertains to stacking is with respect to the orientation in FIG. 10, showing assembly of the components). The off-axis movement described above preferably also facilitates stacking in embodiments using such movement.

By contrast, prior machines separate the vertical stage completely from the other moving axes; that is, the vertical stage is not stacked on any other axis. One concern with this prior approach for miniature machine tools is that the spindle axis typically is the most massive axis. Therefore, the spindle axis (z-axis) in preferred embodiments of the present micro- and meso-scale machining apparatus 20 is kept separate from the other two axes.

However, it is contemplated in alternative embodiments that an actuator for the spindle axis (the z-axis actuator) may be combined with the x- and y-axis actuators, so that the spindle 42 remains stationary, or with the y-axis, so that the spindle is translated along the x-axis. Alternatively, the actuators may be configured such that the workpiece remains stationary. Put another way, in particular embodiments, each of the x-axis (horizontal stage) actuators, the y-axis (vertical stage) actuators, and the z- or spindle axis actuators may translate either the spindle 42 or the workpiece (for example, the workpiece mounting assembly), alone or in combination with the other actuators. Further, it is contemplated that other counterbalances besides constant spring counterbalances may be mounted on the moving part beneath it, but it is preferred that a constant spring counterbalance be used.

Further, typical counterbalancing mechanisms are quite massive compared to the moving mass of the stages, such as in the case of large air cylinders or weight/pulley systems. Since these mechanisms are massive and thus difficult to actuate, it typically is not feasible to mount them to the moving portion of a stage. However, the preferred present counterbalance mechanism 114 is lightweight and easily mounted to a moving stage.

Nearly all large-scale machine tools have protective measures to keep chips and fluids away from sensitive components, such as motors, bearings, etc. The preferred micro- and meso-scale machining apparatus 20 employs a chip guard for this purpose. Some smaller stages (actuator and linear bearing) come equipped with bellows (accordion type) covers for this purpose. However, due to particular features of the preferred moving stages, such as the tight stacking of the horizontal and vertical stages and the raised actuator placement of the z-axis actuator, implementing a bellows chip guard may be difficult.

Figure 14:
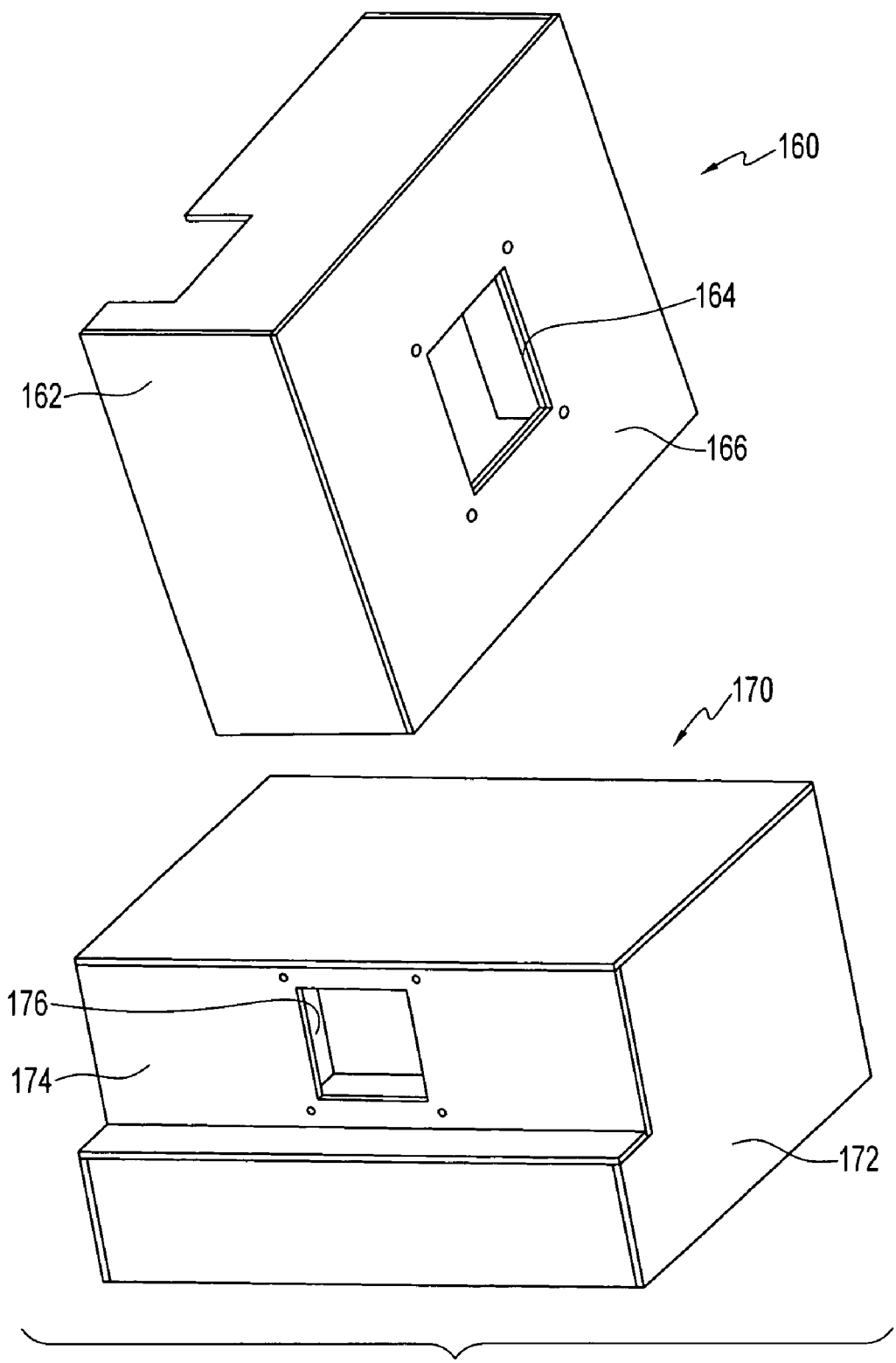
FIG. 14 is a perspective view of chip guards for an x-y axes movement platform and for a z-axis movement platform according to a preferred embodiment of the present invention.

Accordingly, and referring to FIGS. 1 and 14, a protective system for the preferred micro-scale machining apparatus 20 includes a two-axis cover for the horizontal and vertical stages and a single axis cover for the spindle axis. A preferred two-axis cover is embodied in a chip guard boot mount 160, which includes a substantially rectangular casing 162 having an opening 164 at a front surface 166 through which the workpiece mounting mechanism 114 extends. Preferably, the casing of the boot mount 160 is manufactured from a clear polymer. To address concerns with tight axis stacking, a thin rubber boot (not shown) is mounted to the front surface 166 via a frame 168 (as shown in FIGS. 2 and 4) that is fastened to the front surface. The rubber boot preferably surrounds the otherwise exposed workpiece mounting mechanism 114 and the y-axis mounting plate 108, and allows resistance-free movement in two directions over the entire range of travel of the machine.

The spindle axis cover preferably is embodied in a casing 170, such as a two-piece clear polymer case, of which a fixed piece 172 incorporates the side walls and is fixed to the base 22. A removable piece 174 acts as a lid and facilitates tool changes, because it can be removed when the spindle 42 is retracted. The removable piece 174 includes an opening 176 through which the spindle 42 can pass. An annular wiper (not shown), made of an elastomer, for example, is attached to and generally surrounds the opening 176 to seal the area between the casing 170 and the spindle 42 as the spindle extends. The removable piece 174 of the casing 170 preferably is held to the fixed piece 172 using magnets (not shown).

Micro-scale machining apparatuses according to preferred embodiments of the present invention provide significant benefits in the capability to affordably and reliably fabricate micro-scale or meso-scale machined components, due to performance improvements, lowered machine costs, and fast processing times. In this way, miniature machine tools may be implemented beyond a laboratory stage of development into a product suited for more widespread, and possibly commercial, use.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the pending claims.

Various features of the invention are set forth in the appended claims.

What is claimed is:

1. A three-axis micro- or meso-scale machining apparatus comprising:
   a spindle including a tool for machining a workpiece;
   a movement platform for supporting said spindle and translating said spindle along a z-axis;
   a mount for supporting the workpiece;
   an x-y axes movement platform for supporting said mount and translating said mount along both x- and y- axes;
   wherein said x-y axes movement platform includes an x-axis actuator for translating said mount along the x-axis, and a y-axis actuator for translating said mount along the y-axis;
   wherein the y-axis actuator is stacked over the x-axis actuator; and
   wherein the x-axis actuator comprises a pair of stationary motor stators and a pair of moving motor coils for moving within the motor stators along the x-direction.

2. The machining apparatus of claim 1 wherein the y-axis actuator comprises a pair of stationary motor stators and a pair of moving motor coils for moving within the motor stators along the y-direction.

3. The machining apparatus of claim 2 wherein the pair of moving coils of the y-axis actuator are dimensioned to permit movement along the x-direction.

4. The machining apparatus of claim 1 wherein the pair of stationary motor stators and the pair of moving motor coils for the x-axis actuator are symmetrically disposed with respect to the x-direction.

5. The machining apparatus of claim 1 wherein the pair of stationary motor stators and the pair of moving motor coils for the y-axis actuator are symmetrically disposed with respect to the y-direction.

6. A three-axis micro- or meso-scale machining apparatus comprising:
   a spindle including a tool for machining a workpiece;
   a z-axis movement platform for supporting said spindle and translating said spindle along a z-axis;
   a mount for supporting the workpiece;
   an x-y axes movement platform for supporting said mount and translating said mount along both x- and y- axes;
   wherein said z-axis movement platform comprises a pair of stationary motor stators and a pair of moving motor coils for moving within the motor stators along the z-direction.

7. The machining apparatus of claim 6 wherein the pair of moving motor coils are raised within said z-axis moving platform to act substantially though a center of mass of said spindle.

8. A three-axis micro- or meso-scale machining apparatus comprising:
   a spindle including a tool for machining a workpiece;
   a z-axis movement platform for supporting said spindle and translating said spindle along a z-axis;
   a mount for supporting the workpiece;
   an x-y axes movement platform for supporting said mount and translating said mount along both x- and y- axes;
   wherein said spindle is kinematically coupled to said z-axis movement platform; and
   wherein said z-axis movement platform comprises a mount base movable in the z-direction, said spindle being magnetically coupled to the mount base.

9. The machining apparatus of claim 8 wherein said spindle is secured to a mounting plate, and wherein the mounting plate is magnetically coupled to the mount base.

10. The machining apparatus of claim 9 wherein the mounting plate is secured to the mount base via a plurality of mounting balls fixed to the mounting plate and engaging a plurality of vee-blocks secured to the mount base.

11. A three-axis micro- or meso-scale machining apparatus comprising:
    a spindle including a tool for machining a workpiece;
    a movement platform for supporting said spindle and translating said spindle along a z-axis;
    a mount for supporting the workpiece;
    an x-y axes movement platform for supporting said mount and translating said mount along both x- and y- axes;
    further comprising:
       a holder for the workpiece, said holder being kinematically coupled to said mount;
    wherein said holder is magnetically coupled to said mount.

12. The machining apparatus of claim 11 wherein said holder comprises a plate and a plurality of posts, each of the posts including a magnet for magnetically coupling to magnets of said mount.

13. The machining apparatus of claim 12 wherein said plurality of posts are symmetrically positioned away from the center of the plate.

14. The machining apparatus of claim 13 wherein the plate further comprises a plurality of symmetrically disposed mounting balls for engaging with a plurality of vee-blocks of said mount.

15. The machining apparatus of claim 11 further comprising:
    a force sensor disposed within said mount and preloaded by said x-y axes movement platform.

16. The machining apparatus of claim 15 wherein said x-y axes movement platform comprises a mounting plate movable in the x-direction and the y-direction, and wherein said force sensor is preloaded by the mounting plate.

17. The machining apparatus of claim 16 wherein said force sensor comprises a nut that is adjustably preloaded by a bolt secured to the mounting plate.

18. The machining apparatus of claim 16 wherein said force sensor comprises a tri-axial force sensor.

19. A three-axis micro- or meso-scale machining apparatus comprising:
    a spindle including a tool for machining a workpiece;
    a movement platform for supporting said spindle and translating said spindle along a z-axis;
    a mount for supporting the workpiece;
    a movement platform for supporting said mount and translating said mount along x- and y- axes;
    a counterbalance for balancing movement in the y-direction, said counterbalance comprising a constant-force spring.

20. The machining apparatus of claim 19 wherein the movement platform is suspended, and wherein said movement platform includes an x-axis actuator for translating said mount along the x-axis, and a y-axis actuator for translating said mount along the y-axis.

21. The machining apparatus of claim 20 wherein said counterbalance moves with the x-axis actuator.

22. The machining apparatus of claim 21 wherein the x-axis actuator comprises a pair of stationary motor stators and a pair of moving motor coils for moving within the motor stators along the x-direction;
    wherein the y-axis actuator comprises a pair of stationary motor stators and a pair of moving motor coils for moving within the motor stators along the y-direction.

23. The machining apparatus of claim 22 wherein said counterbalance is coupled to one of the moving motor coils of the x-axis actuator.

24. The machining apparatus of claim 23 wherein said counterbalance comprises a motor mount secured to the one of the moving coils of the x-axis actuator, a stage mount secured to a mounting plate platform movable in the y-direction, and at least one constant force spring coupling the motor mount and the mounting plate.

25. The machining apparatus of claim 24 wherein the at least one constant force spring is rotatingly coupled to the motor mount via a bearing.

26. A three-axis micro- or meso-scale machining apparatus comprising:
 a spindle including a tool for machining a workpiece;
 a z-axis movement platform for supporting said spindle and translating said spindle along a z-axis;
 a mount for supporting the workpiece;
 an x-y axes movement platform for supporting said mount and translating said mount along x- and y- axes;
 a guard substantially surrounding said z-axis movement platform and comprising an opening for passage of said spindle;
 another guard substantially surrounding said x-y axes movement platform and comprising an opening for passage of said mount.

27. The machining apparatus of claim 26 wherein said guard further comprises an elastic boot to at least partially cover the opening and allow translation of said mount along the x- and y-axes.

28. The machining apparatus of claim 26 wherein said another guard further comprises a wiper at least partially covering the opening for sealing between the guard and said spindle.

29. The machining apparatus of claim 28 wherein said guard comprises a fixed piece secured to a base of the machining apparatus, and a removable piece for substantially covering said z-axis movement platform.

30. The machining apparatus of claim 29 wherein said fixed piece and said removable piece are magnetically coupled.

31. A three-axis micro- or meso-scale machining apparatus comprising:
 means for machining a workpiece;
 means for mounting the workpiece;
 z-axis means for translating one of said means for machining and said means for mounting along a z-axis;
 x-axis means for translating one of said means for machining and said means for mounting along an x-axis;
 y-axis means for translating one of said means for machining and said means for mounting along a y-axis;
 wherein said y-axis means is stacked over at least one of said x-axis means and said z-axis means;
 further comprising:
 means for force sensing, said means for force sensing being preloaded by said means for mounting.

32. A three-axis micro- or meso-scale machining apparatus comprising:
 means for machining a workpiece;
 means for mounting the workpiece;
 z-axis means for translating one of said means for machining and said means for mounting along a z-axis;
 x-axis means for translating one of said means for machining and said means for mounting along an x-axis;
 y-axis means for translating one of said means for machining and said means for mounting along a y-axis;
 wherein said y-axis means is stacked over at least one of said x-axis means and said z-axis means;
 further comprising:
 constant force means for counterbalancing force in the y-direction.

33. The machining apparatus of claim 32 wherein said means for counterbalancing moves along one of the x-axis and the z-axis.

34. A three-axis micro- or meso-scale machining apparatus comprising:
 a spindle including a tool for machining a workpiece;
 a mount for supporting the workpiece;
 a horizontal axis actuator for translating one of said spindle and said mount along a horizontal axis;
 a vertical axis actuator for translating one of said spindle and said mount along a vertical axis;
 a spindle axis actuator for translating one of said spindle and said mount along a spindle axis;
 at least one of said horizontal axis actuator, said vertical axis actuator, and said spindle axis actuator comprising a pair of actuators symmetrically disposed with respect to the horizontal axis, the vertical axis, and the spindle axis, respectively;
 wherein at least one of said horizontal axis actuator, said vertical axis actuator, and said spindle axis actuator comprises a stationary piece and a moving piece, wherein the moving piece is raised to a center of mass moving along the respective axis.

35. A three-axis micro- or meso-scale machining apparatus comprising:
 a spindle including a tool for machining a workpiece;
 a mount for supporting the workpiece;
 a horizontal axis actuator for translating one of said spindle and said mount along a horizontal axis;
 a vertical axis actuator for translating one of said spindle and said mount along a vertical axis;
 a spindle axis actuator for translating one of said spindle and said mount along a spindle axis;
 said vertical axis actuator comprising a moving piece and a stationary piece, wherein the moving piece of said vertical axis actuator is fixed to and movable with one of said horizontal axis actuator and said spindle actuator, and wherein the stationary piece remains stationary.

36. The machining apparatus of claim 35 wherein said moving piece comprises a motor coil and said stationary piece comprises a motor stator.

37. The machining apparatus of claim 36 wherein the motor coil is elongated to permit movement along both the vertical axis and one of the horizontal axis and the spindle axis.

38. The machining apparatus of claim 35 further comprising:
 a counterbalance secured to a moving piece of the one of said horizontal axis actuator and said spindle actuator and to a vertical stage movable by said vertical axis actuator.

39. The machining apparatus of claim 38 wherein said counterbalance comprises a constant force spring.

40. A three-axis micro- or meso-scale machining apparatus comprising:
 a spindle including a tool for machining a workpiece;
 a platform for supporting said spindle;
 a mount for supporting the workpiece;
 a horizontal axis actuator for translating one of said spindle and said mount along a horizontal axis;
 a vertical axis actuator for translating one of said spindle and said mount along a vertical axis;
 a spindle axis actuator for translating one of said spindle and said mount along a spindle axis;

a constant-force spring counterbalance for supporting a vertical stage translated by said vertical axis actuator.

41. A three-axis micro- or meso-scale machining apparatus comprising:
- a spindle including a tool for machining a workpiece;
- a platform for supporting said spindle;
- a mount for supporting the workpiece, said mount comprising a platform;
- a horizontal axis actuator for translating one of said spindle and said platform along a horizontal axis;
- a vertical axis actuator for translating one of said spindle and said platform along a vertical axis;
- a spindle axis actuator for translating one of said spindle and said platform along a spindle axis;
- a force sensor preloaded by said platform.

* * * * *

UNITED STATES PATENT AND TRADEMARK OFFICE
CERTIFICATE OF CORRECTION

PATENT NO.       : 7,524,152 B2
APPLICATION NO.  : 11/004045
DATED            : April 28, 2009
INVENTOR(S)      : Honegger et al.

It is certified that error appears in the above-identified patent and that said Letters Patent is hereby corrected as shown below:

On the Title Page:

Item (73) Assignee:

Delete "The Board of Trustees if the University of Illinois" and insert --The Board of Trustees of the University of Illinois-- in its place.

Signed and Sealed this

Eighth Day of December, 2009

David J. Kappos
*Director of the United States Patent and Trademark Office*